United States Patent
Rahman et al.

(10) Patent No.: US 11,496,399 B2
(45) Date of Patent: Nov. 8, 2022

(54) DYNAMICALLY BALANCING TRAFFIC IN A FABRIC USING TELEMETRY DATA

(71) Applicant: Cisco Technology, Inc., San Jose, CA (US)

(72) Inventors: Reshad Rahman, Ottawa (CA); Victor M. Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 16/172,547

(22) Filed: Oct. 26, 2018

(65) Prior Publication Data

US 2020/0136973 A1    Apr. 30, 2020

(51) Int. Cl.
| | |
|---|---|
| *H04L 47/125* | (2022.01) |
| *H04L 43/0829* | (2022.01) |
| *H04L 45/02* | (2022.01) |
| *H04L 45/48* | (2022.01) |
| *H04L 45/745* | (2022.01) |
| *H04L 47/26* | (2022.01) |
| *H04L 49/25* | (2022.01) |
| *H04L 43/0852* | (2022.01) |
| *H04L 45/121* | (2022.01) |
| *H04L 45/00* | (2022.01) |
| *H04W 40/12* | (2009.01) |
| *G06N 20/00* | (2019.01) |
| *G06N 3/08* | (2006.01) |

(52) U.S. Cl.
CPC .......... *H04L 47/125* (2013.01); *G06N 20/00* (2019.01); *H04L 43/0829* (2013.01); *H04L 45/02* (2013.01); *H04L 45/08* (2013.01); *H04L 45/48* (2013.01); *H04L 45/745* (2013.01); *H04L 47/26* (2013.01); *H04L 49/25* (2013.01)

(58) Field of Classification Search
None
See application file for complete search history.

(56) References Cited

U.S. PATENT DOCUMENTS

| | | | | |
|---|---|---|---|---|
| 7,177,325 | B2 | 2/2007 | Claseman | |
| 9,763,135 | B1* | 9/2017 | Shvarts | ................ H04W 28/08 |
| 2008/0195755 | A1* | 8/2008 | Lu | .......................... H04L 45/00 |
| | | | | 709/241 |
| 2015/0127797 | A1 | 5/2015 | Attar et al. | |
| 2015/0297875 | A1 | 10/2015 | Fraser et al. | |
| 2016/0142243 | A1* | 5/2016 | Karam | ................ H04L 41/0806 |
| | | | | 709/202 |

(Continued)

*Primary Examiner* — Jeffrey M Rutkowski
*Assistant Examiner* — Ning Li
(74) *Attorney, Agent, or Firm* — Patterson + Sheridan, LLP

(57) ABSTRACT

Techniques for improved routing based on network traffic are provided. Telemetry data relating to a first network node of a plurality of network nodes in a locator ID separation protocol (LISP) fabric is received. A first portion of the telemetry data that relates to a first destination of a plurality of destinations is identified. Further, a first routing weight associated with a first interface of the first network node is revised based on the first portion of the telemetry data, where the first interface is associated with the first destination. The revised first routing weight is published to a second plurality of network nodes in the LISP fabric, wherein the second plurality of network nodes route packets to the first network node based in part on the revised first routing weight.

17 Claims, 6 Drawing Sheets

(56) References Cited

U.S. PATENT DOCUMENTS

| | | | |
|---|---|---|---|
| 2016/0212696 A1* | 7/2016 | Tu | H04W 28/08 |
| 2016/0261507 A1* | 9/2016 | Kwak | H04L 47/125 |
| 2016/0352617 A1* | 12/2016 | Wang | H04L 43/10 |
| 2017/0026417 A1* | 1/2017 | Ermagan | H04L 63/0272 |
| 2017/0126496 A1* | 5/2017 | Sikand | H04L 41/0886 |
| 2017/0208635 A1* | 7/2017 | Grootwassink | H04L 12/4633 |
| 2017/0339623 A1* | 11/2017 | Pillay-Esnault | H04W 64/006 |
| 2018/0098248 A1* | 4/2018 | Torres | H04L 47/823 |
| 2018/0159759 A1* | 6/2018 | Liang | H04L 45/02 |
| 2018/0176134 A1 | 6/2018 | Pignataro et al. | |
| 2018/0367459 A1* | 12/2018 | Chandrasekaran | H04L 47/20 |
| 2019/0081890 A1* | 3/2019 | Ravindran | H04L 67/327 |
| 2019/0268421 A1* | 8/2019 | Markuze | H04L 67/10 |
| 2019/0383621 A1* | 12/2019 | Isaacs | G01C 21/3484 |
| 2020/0036624 A1* | 1/2020 | Michael | H04L 45/24 |
| 2020/0106696 A1* | 4/2020 | Michael | H04L 45/123 |

* cited by examiner

DYNAMICALLY BALANCING TRAFFIC IN A FABRIC USING TELEMETRY DATA

TECHNICAL FIELD

Embodiments presented in this disclosure generally relate to traffic balancing in network fabrics. More specifically, embodiments disclosed herein relate to use of telemetry to dynamically reconfigure path weights in network fabrics.

BACKGROUND

In many fabric architectures, there can be any number of paths or connections between two points in the fabric. For example, any computing device may be connected to two or more network nodes (e.g., routers, switches, etc.), or may be assigned two or more interfaces on a single device (or across multiple devices). In such an architecture, other network nodes can select a particular path or interface from the available options in order to route data to the computing device. Typically, this routing is balanced such that each path has a similar amount of traffic (e.g., a similar amount of data, or a similar number of packets or flows). However, if a particular path is affected by traffic, failure, or degradation of a portion of the network, these balancing mechanisms fail to provide satisfactory results.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
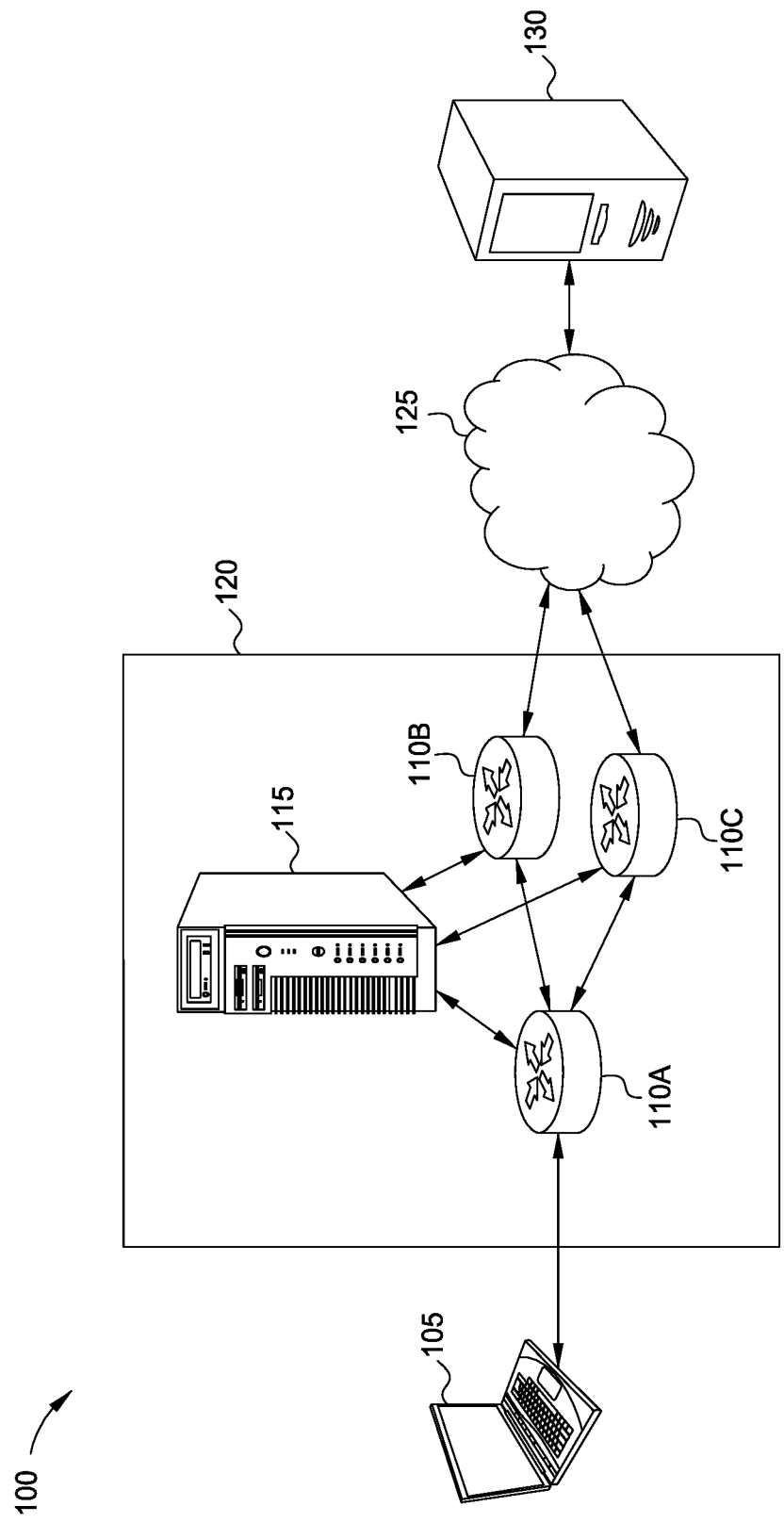
FIG. 1 illustrates a system including a fabric configured to load-balance traffic based on telemetry, according to one embodiment disclosed herein.

According to one embodiment presented in this disclosure, a method is provided. The method includes receiving telemetry data relating to a first network node of a plurality of network nodes in a locator ID separation protocol (LISP) fabric. The method also includes identifying a first portion of the telemetry data that relates to a first destination of a plurality of destinations. Additionally, the method includes revising a first routing weight associated with a first interface of the first network node based on the first portion of the telemetry data, wherein the first interface is associated with the first destination. Finally, the method includes publishing the revised first routing weight to a second plurality of network nodes in the LISP fabric, wherein the second plurality of network nodes route packets to the first network node based in part on the revised first routing weight.

According to a second embodiment presented in this disclosure, a system comprising one or more computer processors and logic encoded in a non-transitory medium that, when executed by the one or more computer processors performs an operation is provided. The operation includes receiving telemetry data relating to a first network node of a plurality of network nodes in a locator ID separation protocol (LISP) fabric. The operation also includes identifying a first portion of the telemetry data that relates to a first destination of a plurality of destinations. Additionally, the operation includes revising a first routing weight associated with a first interface of the first network node based on the first portion of the telemetry data, wherein the first interface is associated with the first destination. Finally, the operation includes publishing the revised first routing weight to a second plurality of network nodes in the LISP fabric, wherein the second plurality of network nodes route packets to the first network node based in part on the revised first routing weight.

According to a third embodiment presented in this disclosure, a computer program product comprising logic encoded in a non-transitory medium, the logic executable by operation of one or more computer processors to perform an operation, is provided. The operation includes receiving telemetry data relating to a first network node of a plurality of network nodes in a locator ID separation protocol (LISP) fabric. The operation also includes identifying a first portion of the telemetry data that relates to a first destination of a plurality of destinations. Additionally, the operation includes revising a first routing weight associated with a first interface of the first network node based on the first portion of the telemetry data, wherein the first interface is associated with the first destination. Finally, the operation includes publishing the revised first routing weight to a second plurality of network nodes in the LISP fabric, wherein the second plurality of network nodes route packets to the first network node based in part on the revised first routing weight.

EXAMPLE EMBODIMENTS

In order to provide intelligent and dynamic load balancing, embodiments of the present disclosure utilize network telemetry to dynamically revise weights and/or priorities of redundant paths and interfaces. In an embodiment, as data enters the network or fabric at an ingress node, the ingress node adds telemetry to the packet, and determines how to route it based on a variety of factors. In some embodiments, the ingress node utilizes weights and/or priorities provided by a centralized component in order to facilitate load balancing. The packet is then forwarded to an egress node, in order to be forwarded out of the fabric and to the end device. In some embodiments, the telemetry comprises operations, administration, and maintenance (OAM) data, or in-band and/or in-situ OAM (IOAM).

In one embodiment, the fabric is configured using a locator/identifier separation protocol (LISP) architecture. In some embodiments, this fabric utilizes tunneling to transport the packets from the ingress node to the egress node of the fabric. In one embodiment, the ingress node is an ingress tunnel router (ITR) while the egress node is an egress tunnel router (ETR). In some embodiments, in order to route packets through the fabric, the ingress node receives mapping information from a centralized mapping component. In one embodiment, the mapping component is a map server (MS), map resolver (MR), or a combined MR/MS.

In some embodiments, the ingress node queries the mapping system to receive mapping information. In other embodiments, the mapping information is periodically pushed or published to the ingress nodes. In one embodiment, when a packet or flow is received at the ingress node, the ingress node queries the mapping information based on the destination associated with the packet (e.g., the endpoint identifier (EID), or destination prefix) to identify potential paths or interfaces that the packet can be sent on. In one embodiment, the mapping information includes a list of routing locators (RLOCs), each with a relative weight and/or priority, that can be used to forward the packet. In an embodiment, each RLOC corresponds to an egress node that is communicatively coupled with the desired destination. As used herein, a network node (e.g., an ingress node or egress node) may refer to a physical or virtual switch, router, gateway, or other network device. Further, in embodiments, network node may refer to a particular interface or port, such that a single physical switch can include any number of logical nodes. That is, although a device may be connected to a single network device, there may be multiple network nodes (e.g., multiple ports or interfaces) that can be used to reach the device.

In embodiments, the weights and/or priorities of each egress node can be adjusted or refined dynamically based on a variety of factors. In various embodiments, the factors considered for each egress node or interface can include latency or delay, packet drops, jitter, and the like. In some embodiments, the weights and/or priorities are periodically revised or refined. For example, in some embodiments, the network nodes gather telemetry data, and periodically transmit it to the mapping component in defined intervals. In one embodiment, this interval is set by a user or administrator. In some embodiments, the interval can be adjusted dynamically based on current load or traffic, as discussed in more detail below. In some embodiments, the interval is adjusted based on a machine learning model, as discussed in more detail below.

In some embodiments, the weights and/or priorities are revised upon the happening of predefined events, or other criteria. For example, in one embodiment, if a particular metric or statistic at a particular node exceeds a predefined threshold (e.g., latency exceeds a maximum value), the node transmits this updated telemetry to the mapping component, which then computes new weighting information for the node. In this way, the traffic can be better routed to take into account the actual current state of the fabric and individual nodes.

In some embodiments, the mapping component generates weights that affect routing in the fabric, which improves the functioning of the network. Advantageously, this intelligent and dynamic routing can reduce overall latency and delay, and improve the connectivity and quality of the communications. In one embodiment, the weights are defined on a per-destination basis (e.g., per EID). For example, in one embodiment, the ingress node determines the destination of the packet (e.g. based on the destination prefix), and identifies egress nodes that can transmit the packet to the destination (based on the mapping information). Thus, in some embodiments, a particular node may be associated with differing weights for respective flows or packets, depending on the respective final destinations.

In some embodiments, in addition to adjusting weighting information for each node or interface, the mapping system also modifies priorities associated with each node or interface. In one embodiment, one or more paths or egress interfaces may be kept in reserve at a lower priority, such that they are not used to forward data to the associated destination unless all paths with higher priority are unavailable. In some embodiments, if the telemetry metrics at a particular node or interface exceed predefined thresholds, the priority of the node can be reduced to eliminate (or significantly reduce) traffic flowing through it, until it can recover or the problem can be diagnosed. Similarly, in an embodiment, if the metric(s) are below defined thresholds (e.g., the latency is very low), the priority of the node can be increased.

FIG. 1 illustrates a system 100 including a Fabric 120 configured to load-balance traffic based on telemetry, according to one embodiment disclosed herein. In one embodiment, the Fabric 120 is a LISP network. As illustrated, the Fabric 120 includes Network Nodes 110A-C, and a Mapping System 115. In an embodiment, the Network Nodes 110A-C route traffic through the Fabric 120 based on mapping information, including weighting and priority information. In one embodiment, the Mapping System 115 provides this mapping information, as illustrated by the dotted arrows. Further, in some embodiments, each Network Node 110 transmits telemetry information collected at the node to the Mapping System 115, to facilitate the determination of these mappings.

Although the illustrated Fabric 120 includes three Network Nodes 110A-C, in embodiments, the Fabric 120 can include any number of Network Nodes 110. Further, the Network Nodes 110 can be communicatively coupled in any way (e.g., via wired, wireless, or a combination of wired and wireless communication links). In some embodiments, each of the Network Nodes 110 may be communicatively coupled with all or a subset of the other nodes in the Fabric 120. As discussed above, in some embodiments, the mapping information (e.g., the available routes, along with the weights and priorities of each path) is defined on the level of individual interfaces or ports, rather than solely on the device level.

In the illustrated embodiment, a Device 105 (e.g., a laptop, computer, mobile phone, or other computing device) is communicatively coupled to a first Network Node 110A in the Fabric 120. Further, in the illustrated embodiment, a Server 130 is communicatively coupled with Network Nodes 110B and 110C, via a separate Network 125. Of course, one of skill in the art will understand that any number of devices and servers can be coupled with the Fabric 120, via any number of Network Nodes 110. In one embodiment, the Device 105 is associated with the Fabric 120, even though it is outside of the Fabric 120. For example, in one embodiment, the Fabric 120 corresponds to a physical site or campus, and the Device 105 is a device within that campus. Further, in one embodiment, the Network 125 represents the Internet, and the Server 130 can be any server, router, gateway, switch, or other computing device that is also connected to the Internet.

In embodiments, each Network Node 110 can act as an ingress node or an egress node, depending on the direction of the traffic. For example, as the Device 105 sends data to the Server 130, the Network Node 110A acts as the ingress node, while the Network Node 110B and/or 110C act as the egress node(s). Similarly, when the Server 130 transmits data to the Device 105, the Network Node 110B and/or 110C act as the ingress node(s), while the Network Node 110A acts as the egress node. In an embodiment, when acting as an ingress node, the Network Node 110 queries mapping information provided by the Mapping System 115 in order to determine which egress interface or node to use. In some embodiments, this determination is made on a per-packet basis. In other embodiments, this determination is made on a per-flow basis, and all packets belonging to the flow utilize the same egress interface.

In one embodiment, Network Nodes 110 that connect to devices associated with the Fabric 120 (such as the Device 105) are referred to as edge nodes, while Network Nodes 110 connecting to the broader Network 125 (e.g., the Internet) are referred to as border nodes. In some embodiments, dynamic weights and priorities are used to affect traffic flowing in more than one direction in the Fabric 120. That is, in an embodiment, dynamic weights can be used both for traffic flowing from an edge node to a border node, as well as from a border node to an edge node. Further, in embodiments, the Mapping System 115 can generate dynamic weights and priorities for traffic flowing from one edge node to another, or from one border node to another.

For example, in such an embodiment, the Network Node 110A accesses the mapping information (including weights and priorities) when determining how to route or tunnel packets to the Server 130 (e.g., through Network Nodes 110B and/or 110C). Similarly, the Network Node 110A can collect and transmit telemetry regarding packets transmitted to the Device 105 (e.g., from the Server 130), such that the weights used by the Network Nodes 110B and 110C can be revised. Further, in such an embodiment, the Network Nodes 110B and 110C access the mapping information (including weights and priorities) when determining how to route or tunnel packets to the Device 105 (e.g., through Network Node 110A). Similarly, the Network Nodes 110B and 110C can collect and transmit telemetry regarding packets transmitted to the Server 130 (e.g., from the Device 105), such that the weights used by the Network Node 110A can be revised.

In this way, the dynamic weighting can be applied in both directions of flow. In embodiments, even if the two tunnel endpoints (e.g., interfaces, ports, nodes, and the like) are the same (e.g., the first flow goes from Network Node 110A to Network Node 110B, and the response flow moves from Network Node 110B to Network Node 110A), the weights and priorities can differ, based on the direction of the respective flow. That is, because the traffic and telemetry metrics at the Network Nodes 110A and 110B are likely to differ, the weights associated with each will also likely differ. Further, in some embodiments, even if the telemetry metrics at each Network Node 110A and 110B are the same, the weights may differ due to telemetry statistics gathered at other nodes (such as Network Node 110C), as discussed in more detail below.

In one embodiment, upon selecting an egress node, the ingress Network Node 110 encapsulates the packet with one or more additional headers, and tunnels the packet to the selected node (either directly, or through one or more intermediary nodes). In an embodiment, the ingress Network Node 110 also adds telemetry relating to the node to a header of the packet. In this way, the packet carries telemetry information through the Fabric 120. In some embodiments, each node that receives the packet similarly appends respective telemetry to the header. In some embodiments, the egress Network Node 110 also adds such telemetry. In other embodiments, the egress Network Node 110 extracts the telemetry in the header, and aggregates its own telemetry with the extracted telemetry.

In an embodiment, upon reaching the egress Network Node 110, the Network Node 110 de-encapsulates the packet (e.g., by stripping the added headers, and decrypting the packet if necessary). In one embodiment, this includes removing the telemetry from the packet. In some embodiments however, the telemetry is carried with the packer out of the Fabric 120. In an embodiment, the egress Network Node 110 transmits telemetry data relating to its own operations, with respect to the packet, to the Mapping System 115. In some embodiments, the Network Node 110 also transmits the telemetry data associated with one or more other nodes in the Fabric 120 (e.g., Network Nodes 110 that the packet passed through).

In some embodiments, the egress Network Node 110 aggregates the telemetry prior to transmitting it. For example, in one embodiment, the Network Node 110 collects the telemetry until defined criteria have been satisfied (such as a period of time, an event occurring, the telemetry metric(s) exceeding a threshold, and the like), and transmits the gathered telemetry upon the criteria being satisfied. In some embodiments, the Network Node 110 further aggregates or summarizes the telemetry on a per-destination basis (e.g., per EID). For example, the Network Node 110B may aggregate telemetry collected from packets destined for the Server 130 into a first aggregate set, and aggregate telemetry from packets destined for some other device into a second set. In this way, the telemetry metrics (and therefore the weights) for a given egress interface or Network Node 110 can differ, depending on the ultimate destination of the packet.

In an embodiment, upon receiving this telemetry, the Mapping System 115 generates or refines the weights and/or priorities associated with each interface or Network Node 110 based on the telemetry, as discussed in more detail below. In one embodiment, the Mapping System 115 then pushes this information to each Network Node 110. In some embodiments, the Mapping System 115 uses a publisher/subscriber model. In such an embodiment, one or more Network Nodes 110 can subscribe to the Mapping System 115 to receive updated mappings for all or for a specified portion of the Fabric 120, whenever it is available. In some embodiments, the Network Nodes 110 request revised mapping information periodically or when needed, rather than receiving pushed information.

Thus, in the illustrated embodiment, the Mapping System 115 collects telemetry from the Network Nodes 110B and 110C, revises mapping information (including weights and priorities), and transmits this revised information to the Network Node 110A for use in making routing decisions. Similarly, in an embodiment, the Mapping System 115 collects telemetry from the Network Node 110A, revises weights and priorities for the Network Node 110A (and/or for ports or interfaces on the node), and transmits these updated mappings to the Network Nodes 110B and 110C. In this way, the Mapping System 115 ensures that the Network Nodes 110 utilize efficient and optimized routing that dynamically adjusts and reacts to load, delays, and problems in the Fabric 120.

Figure 2:
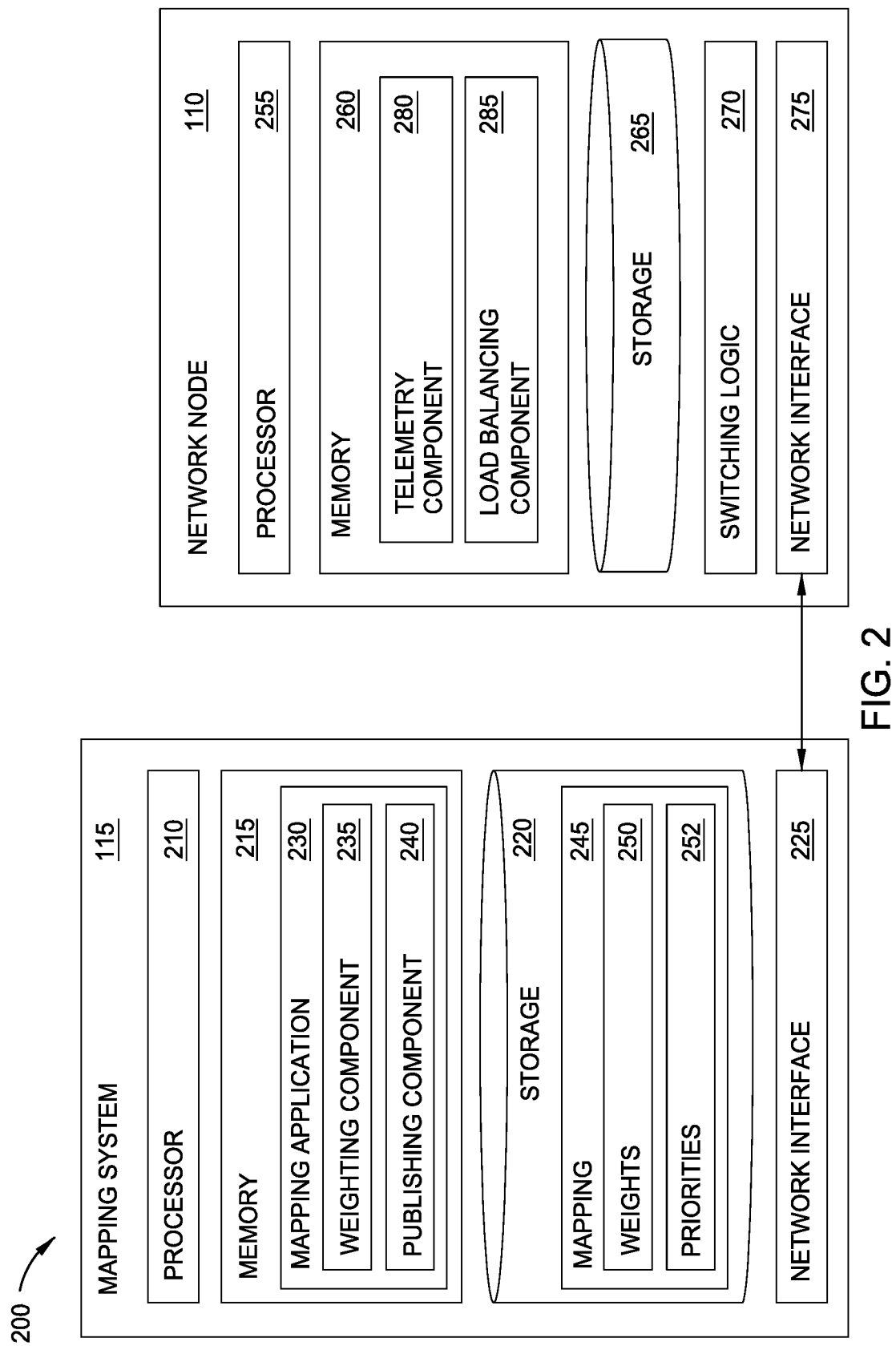
FIG. 2 illustrates a system including a mapping system and a network node configured to load-balance traffic based on telemetry, according to one embodiment disclosed herein.

FIG. 2 illustrates a system 200 including a Mapping System 115 and a Network Node 110 configured to load-balance traffic based on telemetry, according to one embodiment disclosed herein. As illustrated, the Mapping System 115 includes a Processor 210, a Memory 215, and Storage 220. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Via the Network Interface 225, the Mapping System 115 can be communicatively coupled with Network Nodes 110, configuration or administration devices or systems, and the like. Although illustrated as a single Network Interface 225, in embodiments, the Network Interface 225 may include multiple ports or interfaces.

In the illustrated embodiment, the Storage 220 includes a Mapping 245. In an embodiment, the Mapping 245 includes information relating to the communications links between the Network Nodes 110 (e.g., between interfaces or ports) in the Fabric 120. For example, in an embodiment, the Mapping 245 identifies all accessible links between nodes. In one embodiment, when an interface or node is activated or deactivated, or when a communications link is added or removed, the Mapping 245 is updated to reflect the current topology of the Fabric 120. In one embodiment, this update is manually performed. In some embodiments, Network Nodes 110 can inform the Mapping System 115 of this update, and the Mapping System 115 can revise the Mapping 245.

In the illustrated embodiment, the Mapping 245 further includes a set of Weights 250 and Priorities 252 for each interface in the Fabric 120. As discussed above, in embodiments, the Mapping System 115 refines the Weights 250 and/or Priorities 252 periodically or upon specified events. Although illustrated as residing in Storage 220, the Mapping 245 may reside in any other location, such as in Memory 215.

As illustrated, the Memory 215 includes a Mapping Application 230, which includes a Weighting Component 235 and a Publishing Component 240. Although illustrated as discrete components, in embodiments, the functionality of the Weighting Component 235 and Publishing Component 240 may be combined or divided among any number of components. Further, in embodiments, the functionality of the Mapping Application 230 can be implemented using software, hardware, or a combination of software and hardware. In the illustrated embodiment, the Weighting Component 235 receives telemetry information from the Network Nodes 110, and refines the Weights 250 and/or Priorities 252, as discussed in more detail below. Further, in the illustrated embodiment, the Publishing Component 240 publishes or transmits the Mapping 245, including the Weights 250 and Priorities 252, to one or more Network Nodes 110.

In the illustrated embodiment, the Network Node 110 includes a Processor 255, a Memory 260, and Storage 265. In the illustrated embodiment, Processor 255 retrieves and executes programming instructions stored in Memory 260 as well as stores and retrieves application data residing in Storage 265. Processor 255 is representative of a single CPU, multiple CPUs, a single CPU having multiple processing cores, and the like. Memory 260 is generally included to be representative of a random access memory. Storage 265 may be a disk drive or flash-based storage device, and may include fixed and/or removable storage devices, such as fixed disk drives, removable memory cards, or optical storage, network attached storage (NAS), or storage area-network (SAN).

Further, as illustrated, the Network Node 110 includes Switching Logic 270 and a Network Interface 275. In an embodiment, the Switching Logic 270 is used to route packets in the Fabric 120 and to other devices or networks, and may be implemented via software, hardware, or a combination of software and hardware. In one embodiment, the Switching Logic 270 includes one or more application specific integrated circuits (ASICs). Through the Network Interface 275, the Network Node 110 can be communicatively coupled with other Network Nodes 110, the Mapping System 115, configuration or administration devices or systems, and the like. Although illustrated as a single Network Interface 275, in embodiments, the Network Interface 275 may include multiple ports or interfaces.

In the illustrated embodiment, the Memory 260 includes a Telemetry Component 280 and a Load Balancing Component 285. Although illustrated as discrete components, in embodiments, the functionality of the Telemetry Component 280 and Load Balancing Component 285 may be combined or divided among any number of components. Further, although illustrated as software components in memory, in embodiments, the functionality of the Telemetry Component 280 and Load Balancing Component 285 can be implemented using software, hardware, or a combination of software and hardware. In the illustrated embodiment, the Telemetry Component 280 gathers telemetry relating to the Network Node 110. In an embodiment, if the Network Node 110 is acting as an ingress node or an intermediate node for a packet, the Telemetry Component 280 collects telemetry and adds it to a telemetry header associated with the packet. Similarly, if the Network Node 110 is acting as an egress node, the Telemetry Component 280 collects the relevant telemetry (with respect to the packet) for the node, extracts any telemetry in the header of the packet, and transmits this telemetry to the Mapping System 115. In one embodiment, for a particular packet, the Telemetry Component 280 collects metrics such as latency or delay of the Network Node 110 when processing the packet.

In an embodiment, the Load Balancing Component 285 operates in conjunction with the Switching Logic 270 to route packets in a more optimized manner. In an embodiment, the Load Balancing Component 285 receives updated Mappings 245 from the Mapping System 115, and causes the Switching Logic 270 to route packets based on the Mapping 245. In embodiments, the Mapping 245 may be pushed to the Load Balancing Component 285 periodically or upon being revised, or the Load Balancing Component 285 may request the Mapping 245 periodically or upon a predefined event occurring. In an embodiment, the Load Balancing Component 285 searches the Mapping 245 based on the destination prefix of the packet, to determine potential egress interfaces or paths through the Fabric 120. In one embodiment, the Load Balancing Component 285 identifies a list of RLOCs, each of which is associated with a respective priority and weight.

In embodiments, the Load Balancing Component 285 routes packets proportionately, based on the weights associated with each possible path. For example, if two or more egress interfaces (e.g., two or more RLOCs) have the same priority and weight, packets or flows will be split equally between the interfaces. Similarly, if one interface has a higher weight than another, the interface will be used for proportionately more traffic (e.g., if the first interface has a weight of ten and a second interface has a weight of five, the first interface will be used for two thirds of the packets or flows, while the second interface receives one third). In one embodiment, the Load Balancing Component 285 will only utilize a path with a lower priority if there are no paths available with a higher priority (e.g., if they are flagged as unavailable in the Mapping 245).

Figure 3:
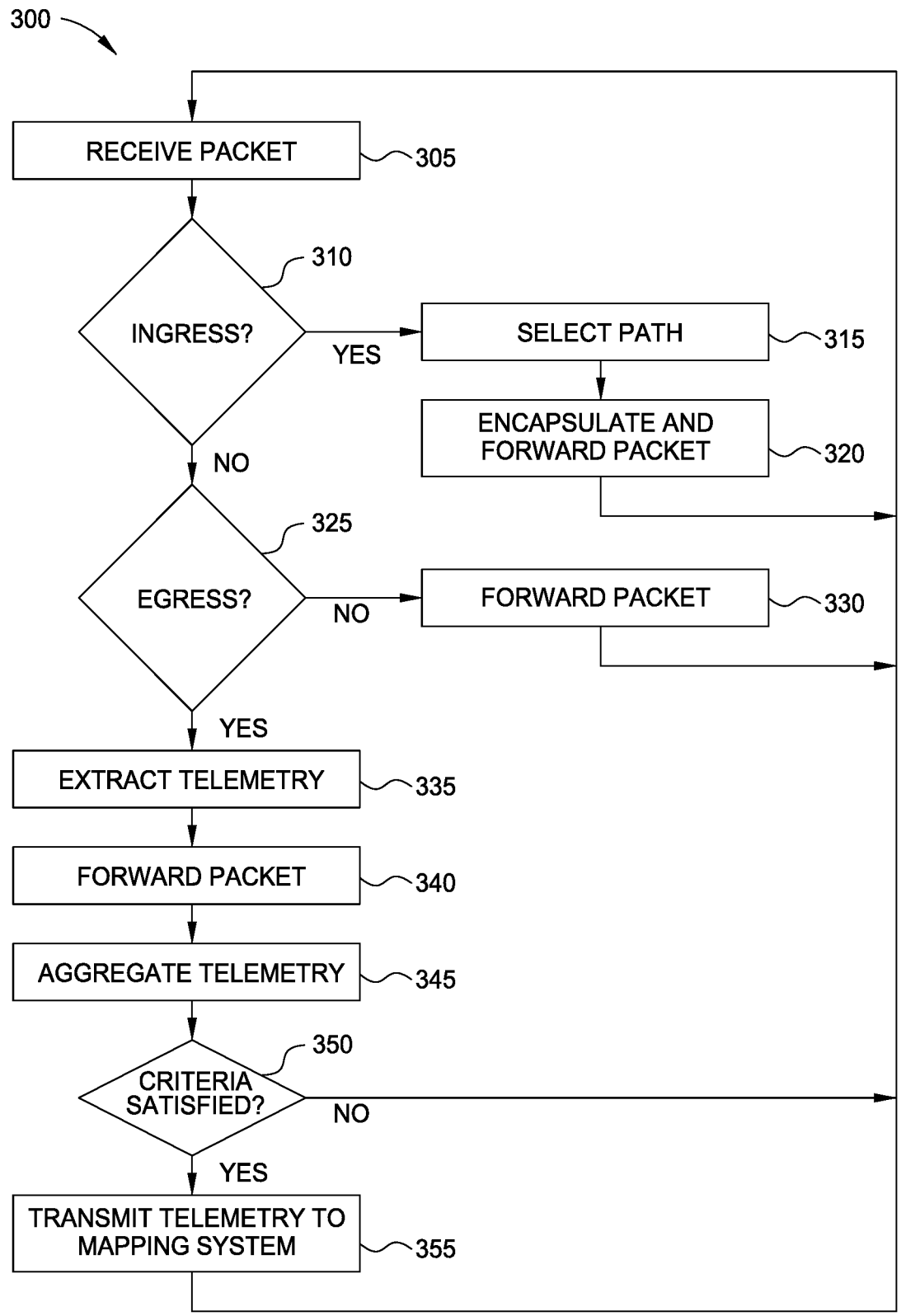
FIG. 3 is a flow diagram illustrating a method of load balancing packets in a fabric, according to one embodiment disclosed herein.

FIG. 3 is a flow diagram illustrating a method 300 of load balancing packets in a fabric, according to one embodiment disclosed herein. In the illustrated embodiment, the method 300 begins at block 305, when a Network Node 110 in a Fabric 120 receives a packet. The method 300 then continues to block 310, where the Network Node 110 determines if it is the ingress node for the packet. That is, in an embodiment, the Network Node 110 determines whether it is the first node in the fabric with respect to the packet (e.g., whether the immediately prior device is included in the fabric or not). If so, the method 300 proceeds to block 315, where the Network Node 110 selects a path (e.g., an interface or node) over which the packet should be sent through the fabric. As discussed above, in embodiments, this selection is based in part on weighting and priority information included in a mapping.

In the illustrated embodiment, this selection is made for each received packet. In some embodiments, however, the selection is made once for each flow. For example, in such an embodiment, when the first packet of a flow is received, the Network Node 110 selects a path or interface to send the packet to. For subsequent packets within the same flow, the Network Node 110 can skip block 315 and use the same path or interface. In some embodiments, the Network Node 110 requests updated mapping information periodically, or upon predefined events occurring. In other embodiments, the Network Node 110 subscribes to the Mapping System 115, and automatically receives the updated mappings when they are published.

The method 300 then continues to block 320, where the Network Node 110 encapsulates and forwards the packet based on the selected path or node. In an embodiment, this comprises tunneling the packet to the selected interface or node. Although not illustrated, in some embodiments, the Network Node 110 also adds telemetry information (e.g., IOAM information) to the packet prior to forwarding it. The method 300 then returns to block 305, to receive a next packet.

If, at block 310, the Network Node 110 determines that it is not the ingress node (e.g., that the prior device in the stream is included in the fabric, or the packet is already encapsulated), the method 300 proceeds to block 325, where the Network Node 110 determines whether it is the egress node (e.g., whether the subsequent or next device is included in the fabric). If not, the Network Node 110 is acting as an intermediary node, and the method 300 continues to block 330. At block 330, the Network Node 110 forwards the packet towards its destination, based on the header(s) that the ingress node used to encapsulate the packet. In some embodiments, the Network Node 110 also adds telemetry relevant to the node to the telemetry header. Further, in some embodiments, the Network Node 110 selects a path or interface to transmit the packet to, based on weighting information, as discussed above. That is, in some embodiments, the weighting information is used at each hop through the fabric, and not solely at the ingress node. In such an embodiment, the packet is effectively tunneled from one node to the next until it reaches the egress, rather than being tunneled from the ingress to the egress node. The method 300 then returns to block 305 to receive a new packet.

If, at block 325, the Network Node 110 determines that it is the egress node for the packet (e.g., that the next or subsequent device is outside of the fabric), the method 300 continues to block 335, where the Network Node 110 extracts telemetry contained in the telemetry header of the packet. This telemetry may have been added, for example, by a prior network node in the path. The method 300 then continues to block 340, where the Network Node 110 forwards the packet along the network (out of the fabric) towards the destination. In some embodiments, the Network Node 110 first de-encapsulates the packet. Further, in some embodiments, the Network Node 110 also removes the telemetry from the packet. The method 300 then proceeds to block 345, where the Network Node 110 aggregates the telemetry.

In some embodiments, aggregating the telemetry includes collecting telemetry for the Network Node 110 itself. In one embodiment, aggregating the telemetry includes storing the telemetry data until predefined criteria have been satisfied, as discussed below in more detail. In some embodiments, aggregating the telemetry includes aggregating it based on the destination prefix associated with the corresponding packet. For example, in one embodiment, the telemetry associated with packets destined for a particular destination is aggregated, such that the aggregate telemetry indicates the average telemetry metrics for the Network Node 110, with respect to the particular destination. In embodiments, the telemetry metrics can include latency or delay, jitter, a percentage or number of packets being dropped, and the like.

At block 350, the Network Node 110 determines whether criteria are satisfied. For example, in one embodiment, the criteria include a defined time period, such that the collected telemetry is transmitted to the Mapping System 115 periodically. In some embodiments, the criteria include specified events. For example, in one embodiment, if a particular metric (e.g., delay) exceeds a predefined threshold, the criteria is satisfied. In some embodiments, the criteria includes receiving a request for the telemetry (e.g., from the Mapping System 115). Additionally, in one embodiment, the telemetry is continuously transmitted to the Mapping System 115, rather than waiting for criteria to be satisfied.

If the criteria are not satisfied, the method 300 returns to block 305 to receive additional packets. If the criteria are satisfied, however, the method 300 proceeds to block 355, where the Network Node 110 transmits the telemetry (including any stored telemetry from prior packets) to the Mapping System 115. In one embodiment, the Network Node 110 transmits telemetry relating to its own operations. In some embodiments, the Network Node 110 also transmits telemetry relating to one or more other nodes in the path of the packet (e.g., as extracted from the telemetry header of the packet). The method 300 then returns to block 305.

Figure 4:
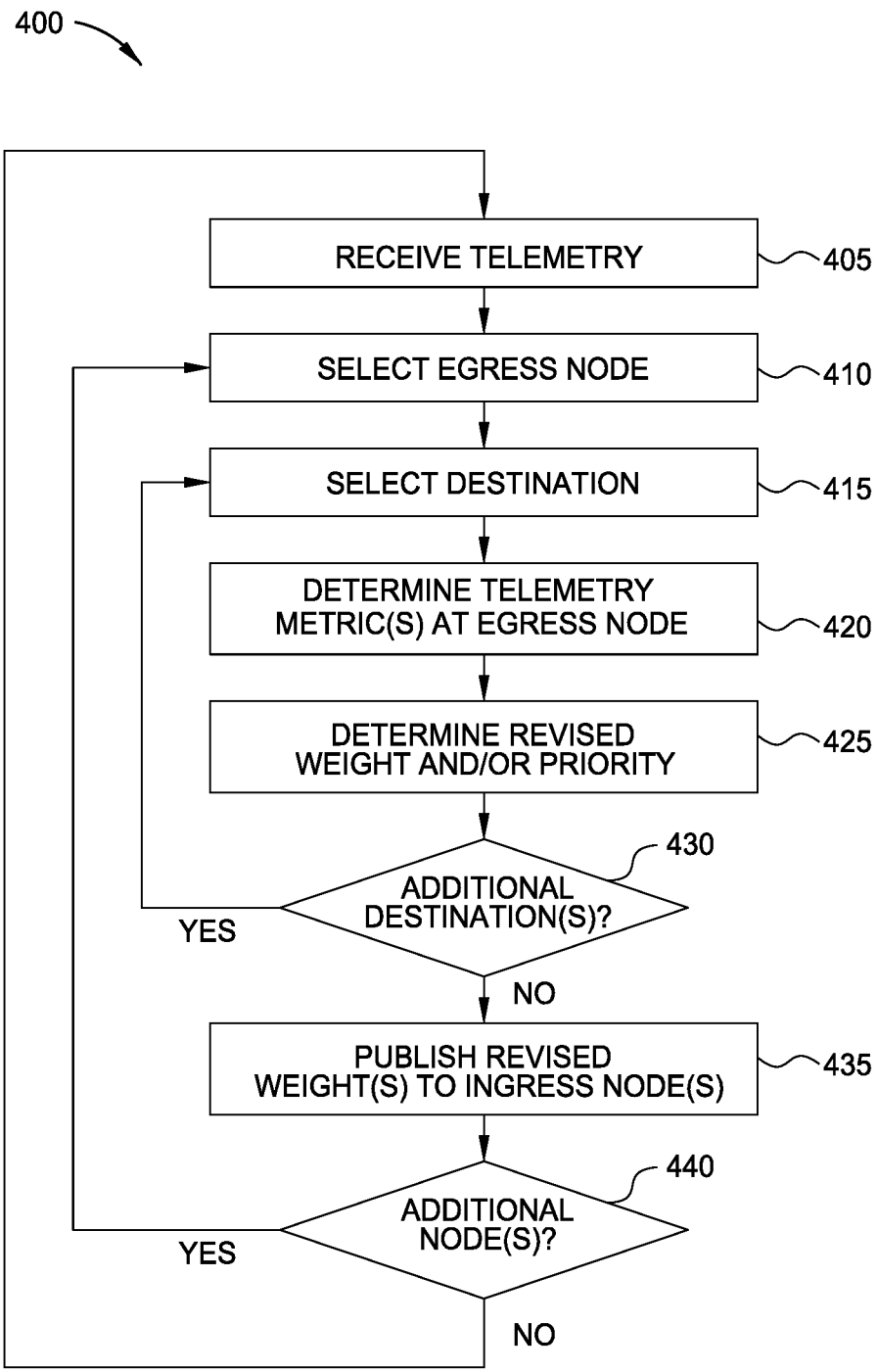
FIG. 4 is a flow diagram illustrating a method of dynamically revising weights and/or priorities in order to load balance traffic in a fabric, according to one embodiment disclosed herein.

FIG. 4 is a flow diagram illustrating a method 400 of dynamically revising weights and/or priorities in order to load balance traffic in a fabric, according to one embodiment disclosed herein. The method 400 begins at block 405, where a Mapping System 115 receives telemetry from one or more Network Nodes 110. In an embodiment, this telemetry is received from egress nodes in the fabric (e.g., nodes that transmit packets out of the fabric). As discussed above, in embodiments, a particular node may act as both an ingress node and an ingress node, depending on the directionality of the flow. In some embodiments, this telemetry is pushed by the Network Nodes 110 to the Mapping System 115. In other embodiments, the Mapping System 115 periodically requests the telemetry.

The method 400 then proceeds to block 410, where the Mapping System 115 selects an egress node. That is, in the illustrated embodiment, the Mapping System 115 determines which Network Nodes 110 transmitted the telemetry, and selects one of them to revise the weights. In some embodiments, as discussed above, this reweighting process is performed on the level of individual interfaces or ports, rather than on the device level. In such an embodiment, the Mapping System 115 selects a port or interface at block 410. In one embodiment, the Mapping System 115 revises weights for all of the Network Nodes 110 at one time (e.g., every five minutes). In some embodiments, the Mapping System 115 may revise the weights for a subset of the nodes. For example, in one embodiment, the Mapping System 115 periodically receives telemetry data, and revises the weights of any nodes where the telemetry metric(s) exceed a threshold, or where the change in the telemetry data exceeds a predefined threshold, as compared to prior telemetry.

The method 400 continues at block 415, where the Mapping System 115 selects a destination. As discussed above, in some embodiments, the Network Nodes 110 aggregate the telemetry on the basis of the ultimate destination of the packet (as determined by, for example, the destination prefix of the packet). In such an embodiment, the Mapping System 115 may receive the telemetry data as a plurality of sets of metrics, where each set corresponds to a particular destination. At block 420, the Mapping System 115 determines the relevant telemetry metrics or statistics for the selected destination at the selected node, based on the telemetry data. In one embodiment, the metrics include data such as latency, delay, packet drops, jitter, and the like. In one embodiment, the particular metrics to be utilized can be determined by a user or administrator.

At block 425, the Mapping System 115 determines a revised weight and/or priority for the selected destination and node, based on the summarized or aggregated telemetry. This process is discussed in more detail below, with reference to FIG. 5. The method 400 then proceeds to block 430, where the Mapping System 115 determines whether additional destinations remain to be analyzed for the selected node. If so, the method 400 returns to block 415, where the Mapping System 115 selects the next destination. Otherwise, the method 400 continues to block 435, where the Mapping System 115 publishes the revised weight(s) and/or priorities to at least the ingress nodes in the fabric. In one embodiment, the revised mapping is published or transmitted to all of the nodes that have requested such updates. In some embodiments, the Mapping System 115 does not publish the revised weights until all the telemetry data has been processed (e.g., after block 440).

At block 440, the Mapping System 115 determines whether there are additional nodes remaining to be processed. If so, the method 400 returns to block 410 to select the next node. If not, the method 400 returns to block 405, to receive the next batch of telemetry data for processing. As discussed above, in some embodiments, the Network Nodes 110 periodically transmit telemetry data to the Mapping System 115. In some embodiments, the Network Nodes 110 continuously transmit this data, and the Mapping System 115 collects and stores it until criteria is satisfied to revise the weights. In embodiments, this criteria can include, for example, a defined time interval, an event in the fabric (such as a node going offline or being activated, traffic or delays, packet drops, and the like).

Figure 5:
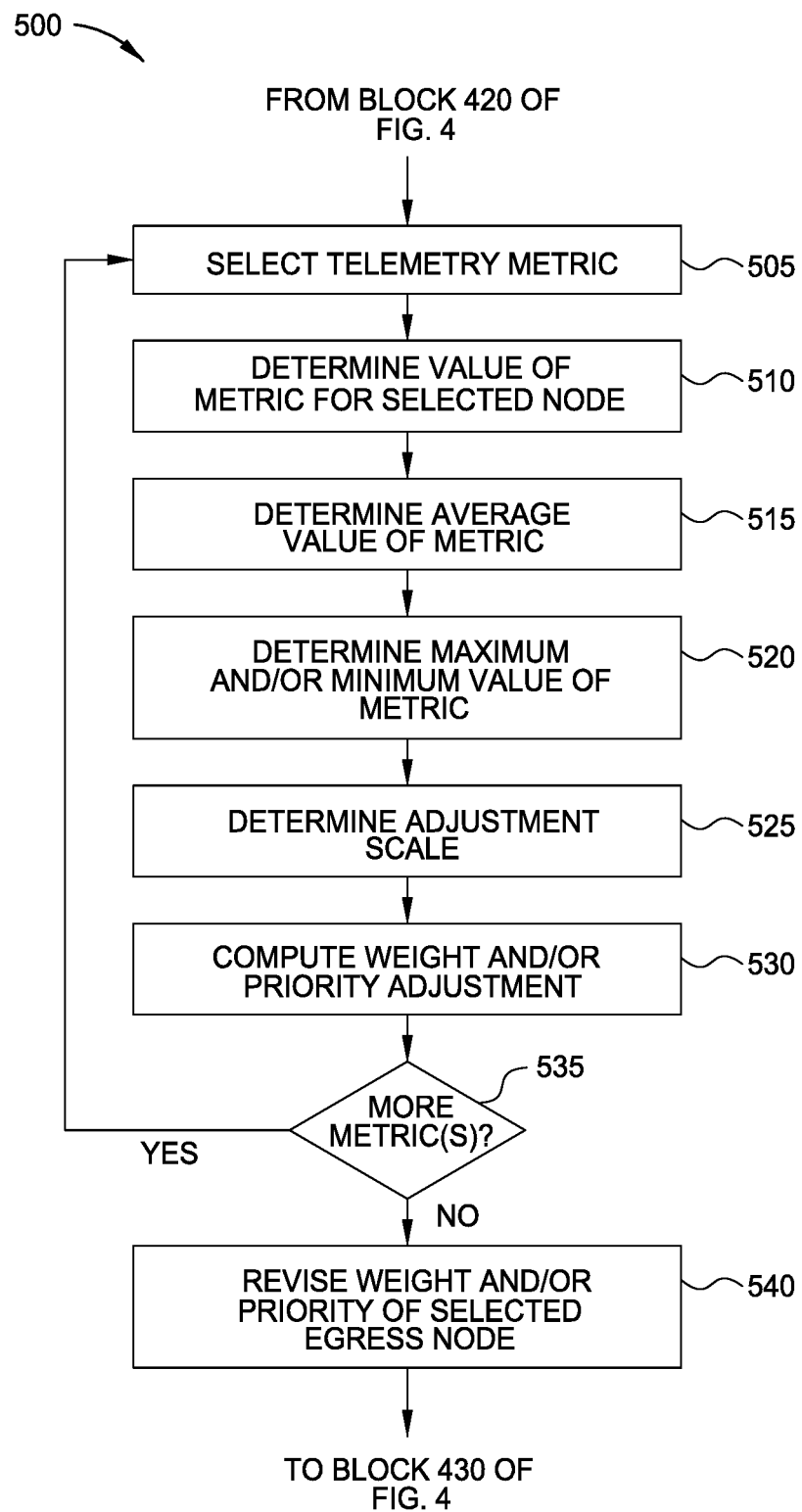
FIG. 5 is a flow diagram illustrating a method of determining revised weights and/or priorities, according to one embodiment disclosed herein.

FIG. 5 is a flow diagram illustrating a method 500 of determining revised weights and/or priorities, according to one embodiment disclosed herein. In the illustrated embodiment, the method 500 provides additional detail for block 425 of FIG. 4. The method 500 begins at block 505, where the Mapping System 115 selects a telemetry metric. As discussed above, in some embodiments, the Mapping System 115 uses multiple metrics when revising weights and priorities. In some embodiments, a single metric is used. The method 500 then proceeds to block 510, where the Mapping System 115 determines the value of the selected metric, with respect to the selected node (or interface) and destination.

As discussed above, the value can include data such as average delay or latency, the jitter, the number or ratio of packet drops, and the like, during the current or most recent defined interval of time. At block 515, the Mapping System 115 determines the average value of the selected metric during the current interval of time, with respect to the selected destination, across all of the egress nodes. For example, suppose a first node has a delay of 1000 microseconds, a second egress node has a delay of 4000 microseconds, and a third egress node has a delay of 10000 microseconds for the selected destination, during the last defined interval. In such an embodiment, the average delay during the interval, with respect to the selected destination, is 5000 microseconds.

The method 500 then proceeds to block 520, where the Mapping System 115 determines the extrema of the data, with respect to the selected destination, across all egress nodes during the interval of time. In one embodiment, the Mapping System 115 utilizes either the maximum or the minimum, depending on the particular metric being processed. For example, in one embodiment, the Mapping System 115 utilizes the maximum value when processing metrics where higher values indicate worse performance, and uses the minimum value when analyzing metrics where lower values indicate worse performance. Continuing the above example, the determined maximum value is 10000 microseconds, which was experienced by the third egress node.

At block 525, the Mapping System 115 determines the adjustment scale to be used. In one embodiment, the adjustment scale is the maximum weight adjustment that is permissible at each interval of time (e.g., each time the weights are revised). In an embodiment, if this scale is too high, the weights may yo-yo around the optimal value. Similarly, if the scale is too low, the fabric will take too long to adjust to changes in traffic and load. In one embodiment, the adjustment scale is defined by a user or administrator. In some embodiments, the scale is determined based on a machine learning model, as discussed in more detail below. Similarly, in an embodiment, the interval of time used can affect the efficacy of the system. If the interval is too high, the weights are less responsive to changes in the fabric. Further, if the interval is too low, the Mapping System 115 may modify weights too rapidly or may waste resources for minimal gains in efficiency. In some embodiments, this interval of time is also determined based on a machine learning model, as discussed in more detail below.

The method 500 then proceeds to block 530, where the Mapping System 115 computes the adjustment needed for the selected node and destination, based on the value of the metric at the node, the average value for the metric, and the extreme value for the metric. In one embodiment, the adjustment is defined using Formula 1, below. In Formula 1, $A_j$ is the needed adjustment for the node or interface i. Further, in Formula 1, $M_a$ is the average value for the metric, across all egress nodes during the last interval T, with respect to the selected destination. Similarly, $M_i$ is the value of the metric at the ith node, and $M_m$ is the maximum or minimum value across all egress nodes during the interval T. Further, in Formula 1, S is the adjustment scale.

$$A_i = \frac{M_a - M_i}{M_m} * S \qquad \text{Formula 1}$$

Continuing the above example, if the adjustment scale is set to 10, the adjustment for the first node (with a delay of 1000) is 4, the adjustment for the second node (with a delay of 4000) is 1, and the adjustment for the third node (with a delay of 10000) is −5. In this way, the first node (e.g., the path or interface with the least delay) has its weight increased so that it will be used more frequently, the second node has its weight increased slightly, and the third node (with the most delay) has its weight reduced so that it will be used less frequently. This allows the Mapping System 115 to dynamically rebalance the traffic on the fabric, to account for real-time load and telemetry metrics.

Once the adjustment, with respect to the selected metric, is determined, the method 500 proceeds to block 535, where the Mapping System 115 determines whether there are additional metrics to be considered. If so, the method 500 returns to block 505. If not, the method 500 proceeds to block 540, where the Mapping System 115 revises the weight and/or priority for the selected node and destination. In some embodiment, the Mapping System 115 adjusts the current weight by aggregating the determined adjustments for each metric used. In one embodiment, this aggregation comprises summing the adjustments. In some embodiments, the aggregation includes averaging the adjustments. In an embodiment, the individual adjustments can be weighted differently, such that each metric has a higher or lower impact on the final overall adjustment.

In some embodiments, the Mapping System 115 also modifies the priority of the path or interface, in addition to the weight. For example, in one embodiment, if the weight (or weight adjustment) is below a predefined threshold, the Mapping System 115 lowers the priority of the node. Similarly, if the weight or weight adjustment exceeds a threshold, the Mapping System 115 can increase the priority of the path. In some embodiments, if a particular metric exceeds a defined threshold, the Mapping System 115 can reduce the priority. For example, regardless of the overall weight, if the number or ratio of packet drops exceeds a threshold, the Mapping System 115 can reduce the priority of the node. After refining the weight and/or priority, the method 500 terminates with respect to the selected destination and interface, and the Mapping System 115 continues to analyze the telemetry data for other destinations and/or nodes.

In some embodiments, the interval T and/or adjustment scale S are determined using one or more machine learning models. For example, in one embodiment, labeled training data is used to train a supervised model. In an embodiment, the training data includes telemetry metrics (such as the average, maximum, and minimum values for each metric. In some embodiments, the training data also includes the metric values for each node). Further, in such an embodiment, the labels for the training data correspond to the optimal interval and scale to use to analyze the data, based on the telemetry metrics. In one embodiment, this interval and scale are determined by an administrator. In some embodiments, this labeled training data is used to train a machine learning model, such as a neural network. For example, in one embodiment, the telemetry data is used as the input for the model, and the labels (e.g., the ideal scale and interval) are used as the target output for the model, in order to refine the internal weights or algorithms used by the model.

In an embodiment, once the model has been trained, the Mapping System 115 can analyze newly received telemetry data using the machine learning model, in order to determine a revised adjustment scale, and/or a revised interval of time. In this way, the Mapping System 115 can modify the algorithm used to revise the weights (e.g., by adjusting the interval used, or modifying the adjustment scale used) in order to better optimize the fabric. This allows not only the weights and priorities to shift based on load, but also enables the algorithm itself to be refined to better handle the changes in the fabric.

Figure 6:
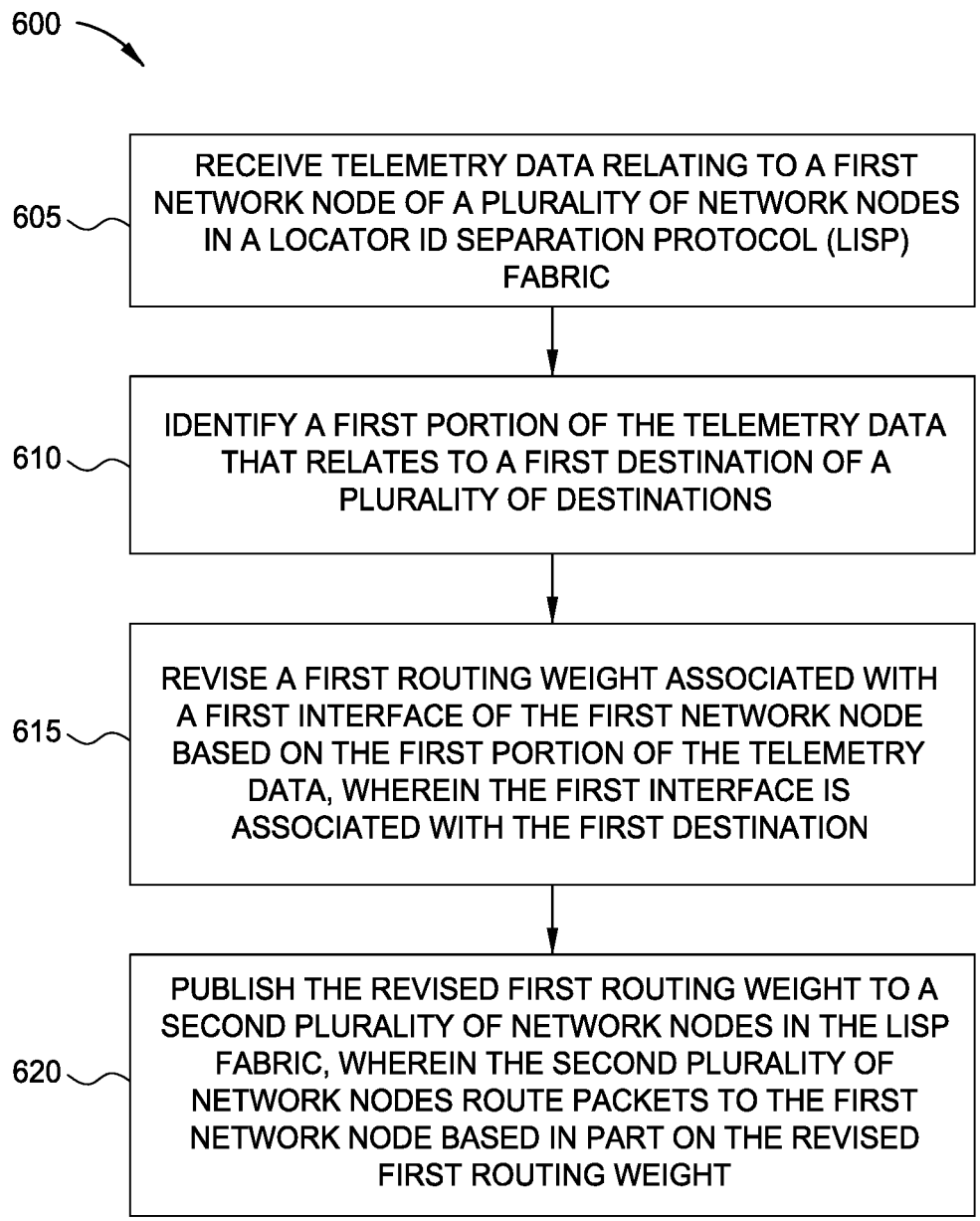
FIG. 6 is a flow diagram illustrating a method of load balancing, according to one embodiment disclosed herein.

FIG. 6 is a flow diagram illustrating a method 600 of load balancing, according to one embodiment disclosed herein. The method 600 begins at block 605, where a Mapping System 115 receives telemetry data relating to a first network node of a plurality of network nodes in a locator id separation protocol (LISP) fabric. The method 600 then continues to block 610, where the Mapping System 115 identifies a first portion of the telemetry data that relates to a first destination of a plurality of destinations. Further, at block 615, the Mapping System 115 revises a first routing weight associated with a first interface of the first network node based on the first portion of the telemetry data, wherein the first interface is associated with the first destination. Finally, the method 600 continues to block 620, where the Mapping System 115 publishes the revised first routing weight to a second plurality of network nodes in the lisp fabric, wherein the second plurality of network nodes route packets to the first network node based in part on the revised first routing weight.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Mapping Application 230) or related data available in the cloud. For example, the Mapping Application 230 could execute on a computing system in the cloud and generate revised weights and priorities for one or more fabrics. In such a case, the Mapping Application 230 could dynamically analyze telemetry and store revised weights and priorities at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a first packet at a first network node of a plurality of network nodes in a locator ID separation protocol (LISP) fabric, the first packet comprising prior telemetry data: (i) previously added to the first packet at a prior network node of the plurality of network nodes and (ii) relating to network transmission performance for the prior network node;
   generating aggregated telemetry data relating to network transmission performance for both the first network node and the prior network node, based on extracting the prior telemetry data from the first packet received at the first network node and aggregating the prior telemetry data with data relating to network transmission performance for the first network node;
   receiving the aggregated telemetry data at a mapping component in the LISP fabric;
   identifying a first portion of the aggregated telemetry data that relates to a first destination of a plurality of destinations;
   revising a first routing weight associated with a first interface of the first network node based on the first portion of the aggregated telemetry data, wherein the first interface is associated with the first destination; and
   publishing the revised first routing weight to a second plurality of network nodes in the LISP fabric, wherein the second plurality of network nodes route packets to the first network node based in part on the revised first routing weight.

2. The method of claim 1, wherein revising the first routing weight is performed by the mapping component, and wherein the each of the second plurality of network nodes is subscribed to the mapping component and receives routing parameters for the fabric.

3. The method of claim 1, wherein the aggregated telemetry data comprises latency data and packet drop data.

4. The method of claim 1, wherein revising the first routing weight associated with the first interface comprises processing the aggregated telemetry data based on a machine learning model.

5. The method of claim 1, the method further comprising:
   identifying a second portion of the aggregated telemetry data that relates to a second destination of the plurality of destinations;
   revising a second routing weight associated with a second interface of the first network node based on the second portion of the aggregated telemetry data, wherein the second interface is associated with the second destination; and
   publishing the revised second routing weight to the second plurality of network nodes.

6. The method of claim 1, wherein the first network node is an egress tunnel router (ETR), and wherein the each of the second plurality of network nodes is an ingress tunnel router (ITR).

7. The method of claim 1, wherein the aggregated telemetry data comprises operations, administration, and maintenance (OAM) data.

8. A system comprising:
   one or more computer processors; and
   logic encoded in a non-transitory medium that, when executed by the one or more computer processors performs an operation, the operation comprising:
      receiving a first packet at a first network node of a plurality of network nodes in a locator ID separation protocol (LISP) fabric, the first packet comprising prior telemetry data: (i) previously added to the first packet at a prior network node of the plurality of network nodes and (ii) relating to network transmission performance for the prior network node;
      generating aggregated telemetry data relating to network transmission performance for both the first network node and the prior network node, based on extracting the prior telemetry data from the first packet received at the first network node and aggregating the prior telemetry data with data relating to network transmission performance for the first network node;
      receiving the aggregated telemetry data at a mapping component in the LISP fabric;
      identifying a first portion of the aggregated telemetry data that relates to a first destination of a plurality of destinations;
      revising a first routing weight associated with a first interface of the first network node based on the first portion of the aggregated telemetry data, wherein the first interface is associated with the first destination; and
      publishing the revised first routing weight to a second plurality of network nodes in the LISP fabric, wherein the second plurality of network nodes route packets to the first network node based in part on the revised first routing weight.

9. The system of claim 8, wherein revising the first routing weight is performed by the mapping component, and wherein the each of the second plurality of network nodes is subscribed to the mapping component and receives routing parameters for the fabric.

10. The system of claim 8, wherein the aggregated telemetry data comprises latency data and packet drop data.

11. The system of claim 8, wherein revising the first routing weight associated with the first interface comprises processing the aggregated telemetry data based on a machine learning model.

12. The system of claim 8, the operation further comprising:
   identifying a second portion of the aggregated telemetry data that relates to a second destination of the plurality of destinations;
   revising a second routing weight associated with a second interface of the first network node based on the second portion of the aggregated telemetry data, wherein the second interface is associated with the second destination; and
   publishing the revised second routing weight to the second plurality of network nodes.

13. A non-transitory storage medium, storing a computer program executable by operation of one or more computer processors to perform an operation comprising:
   receiving a first packet at a first network node of a plurality of network nodes in a locator ID separation protocol (LISP) fabric, the first packet comprising prior telemetry data: (i) previously added to the first packet at a prior network node of the plurality of network nodes and (ii) relating to network transmission performance for the prior network node;
   generating aggregated telemetry data relating to network transmission performance for both the first network node and the prior network node, based on extracting the prior telemetry data from the first packet received at the first network node and aggregating the prior telemetry data with data relating to network transmission performance for the first network node;

receiving the aggregated telemetry data at a mapping component in the LISP fabric;

identifying a first portion of the aggregated telemetry data that relates to a first destination of a plurality of destinations;

revising a first routing weight associated with a first interface of the first network node based on the first portion of the aggregated telemetry data, wherein the first interface is associated with the first destination; and publishing the revised first routing weight to a second plurality of network nodes in the LISP fabric, wherein the second plurality of network nodes route packets to the first network node based in part on the revised first routing weight.

14. The non-transitory storage medium of claim 13, wherein revising the first routing weight is performed by the mapping component, and wherein the each of the second plurality of network nodes fife is subscribed to the mapping component and receives routing parameters for the fabric.

15. The non-transitory storage medium of claim 13, wherein the aggregated telemetry data comprises latency data and packet drop data.

16. The non-transitory storage medium of claim 13, wherein revising the first routing weight associated with the first interface comprises processing the aggregated telemetry data based on a machine learning model.

17. The non-transitory storage medium of claim 13, the operation further comprising:

identifying a second portion of the aggregated telemetry data that relates to a second destination of the plurality of destinations;

revising a second routing weight associated with a second interface of the first network node based on the second portion of the aggregated telemetry data, wherein the second interface is associated with the second destination; and publishing the revised second routing weight to the second plurality of network nodes.

* * * * *

UNITED STATES PATENT AND TRADEMARK OFFICE
CERTIFICATE OF CORRECTION

PATENT NO. : 11,496,399 B2
APPLICATION NO. : 16/172547
DATED : November 8, 2022
INVENTOR(S) : Reshad Rahman et al.

It is certified that error appears in the above-identified patent and that said Letters Patent is hereby corrected as shown below:

In the Specification

In Column 12, Line 63, delete "$A_j$" and insert -- $A_i$ --.

In the Claims

In Column 19, Line 20, in Claim 14, after "nodes" delete "fife".

Signed and Sealed this
Seventh Day of February, 2023

Katherine Kelly Vidal
*Director of the United States Patent and Trademark Office*